(12) United States Patent
Yamasaki et al.

(10) Patent No.: US 11,537,794 B2
(45) Date of Patent: Dec. 27, 2022

(54) LEARNING DEVICE, LEARNING METHOD, COMPUTER PROGRAM PRODUCT, AND INFORMATION PROCESSING SYSTEM

(71) Applicant: KABUSHIKI KAISHA TOSHIBA, Minato-ku (JP)

(72) Inventors: Tomohiro Yamasaki, Bunkyo (JP); Yoshiyuki Kokojima, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 372 days.

(21) Appl. No.: 16/545,787

(22) Filed: Aug. 20, 2019

(65) Prior Publication Data

US 2020/0226215 A1    Jul. 16, 2020

(30) Foreign Application Priority Data

Jan. 11, 2019 (JP) ............................ JP2019-003439

(51) Int. Cl.
*G06F 40/20* (2020.01)
*G06K 9/62* (2022.01)
(Continued)

(52) U.S. Cl.
CPC ......... *G06F 40/268* (2020.01); *G06K 9/6215* (2013.01); *G06N 3/04* (2013.01)

(58) Field of Classification Search
USPC .............. 704/7–10, 231–259; 707/601–602, 707/705–710, 726–730, 748–750;
(Continued)

(56) References Cited

U.S. PATENT DOCUMENTS 9,346,167 B2 *  5/2016  O'Connor  .............. G06N 3/008
2009/0228263 A1 *  9/2009  Kamatani  ............... G06F 40/42
704/4

(Continued)

FOREIGN PATENT DOCUMENTS

JP         4025181 B2 * 12/2007  ............. G06T 17/30
JP      2017-76281 A      4/2017
(Continued)

OTHER PUBLICATIONS

Z. Zhao et al., "Ngram2vec: Learning Improved Word Representations from Ngram Co-occurrence Statistics", Proceedings of Empirical Methods in Natural Language Processing, 2017, pp. 244-253.

*Primary Examiner* — Marcellus J Augustin
(74) *Attorney, Agent, or Firm* — Oblon, McClelland, Maier & Neustadt, L.L.P.

(57) ABSTRACT

A learning device includes one or more processors. The processors input, to an input layer of a neural network including hidden layers defined for respective first arrangement patterns indicating arrangement of one or more words, and output layers connected with some of hidden layers, one or more first morphemes conforming to any of first arrangement patterns, among morphemes included in a document, and learn the neural network to minimize a difference between one or more second morphemes conforming to any of second arrangement patterns indicating arrangement of one or more words, among morphemes included in the document, and output morphemes from the neural network for the input first morphemes. The processors output an embedding vector of the first morphemes that is obtained based on a weight of the learned neural network.

10 Claims, 7 Drawing Sheets

(51) Int. Cl.
    *G06N 3/02*       (2006.01)
    *G06F 40/268*    (2020.01)
    *G06N 3/04*       (2006.01)

(58) Field of Classification Search
    USPC .................................................. 706/12–48
    See application file for complete search history.

(56) References Cited

U.S. PATENT DOCUMENTS

| | | | | |
|---|---|---|---|---|
| 2017/0011289 | A1* | 1/2017 | Gao | G06F 40/268 |
| 2018/0225553 | A1* | 8/2018 | Ha | G06F 16/355 |
| 2018/0349349 | A1* | 12/2018 | Bellegarda | G06F 40/268 |

FOREIGN PATENT DOCUMENTS

| | | | | |
|---|---|---|---|---|
| KR | 20160069329 | * | 6/2016 | G10L 25/30 |
| KR | 20180118906 | * | 11/2018 | G06N 3/0472 |

* cited by examiner

FIG.4

| WORD | WORD CLASS | EVALUATION VALUE |
|---|---|---|
| 「今日 (kyo) | NOUN | 5 |
| 今日は (kyo wa) | INTERJECTION | 3 |
| は (wa) | NOUN | 1 |
| は (wa) | POSTPOSITIONAL PARTICLE | 4 |
| いい (ii) | ADJECTIVE | 3 |
| はい (hai) | INTERJECTION | 1 |
| 天 (ten) | NOUN | 3 |
| 天気 (tenki)」 | NOUN | 5 |
| ⋮ | ⋮ | ⋮ |

FIG.5

「今日はいい天気ですね。」 (kyo wa ii tenki desu ne 。) 〜501

↓

511 512 513 514 515 516 517

「今日/は/いい/天気/です/ね/。」〜502
(kyo)(wa)(ii)(tenki)(desu)(ne)(。)

LEARNING DEVICE, LEARNING METHOD, COMPUTER PROGRAM PRODUCT, AND INFORMATION PROCESSING SYSTEM

CROSS-REFERENCE TO RELATED APPLICATIONS

This application is based upon and claims the benefit of priority from Japanese Patent Application No. 2019-003439, filed on Jan. 11, 2019; the entire contents of which are incorporated herein by reference.

FIELD

Embodiments described herein relate generally to a learning device, a learning method, a computer program product, and an information processing system.

BACKGROUND

There has been proposed a technique of obtaining information (embedding vector) indicating a feature of a word or a word sequence representing contiguous words, using a neural network. For example, a word (word sequence) in a document is used as an input, and a neural network is learned so that a word (word sequence) surrounding the word (word sequence) can be predicted. Each row of a weighting matrix of the neural network obtained in this manner is obtained as an embedding vector.

BRIEF DESCRIPTION OF THE DRAWINGS

FIG. 4 is a diagram illustrating an example of word information referred to in morphological analysis;
FIG. 5 is a diagram illustrating an example of a morphological analysis result.

DETAILED DESCRIPTION

Figure 1:
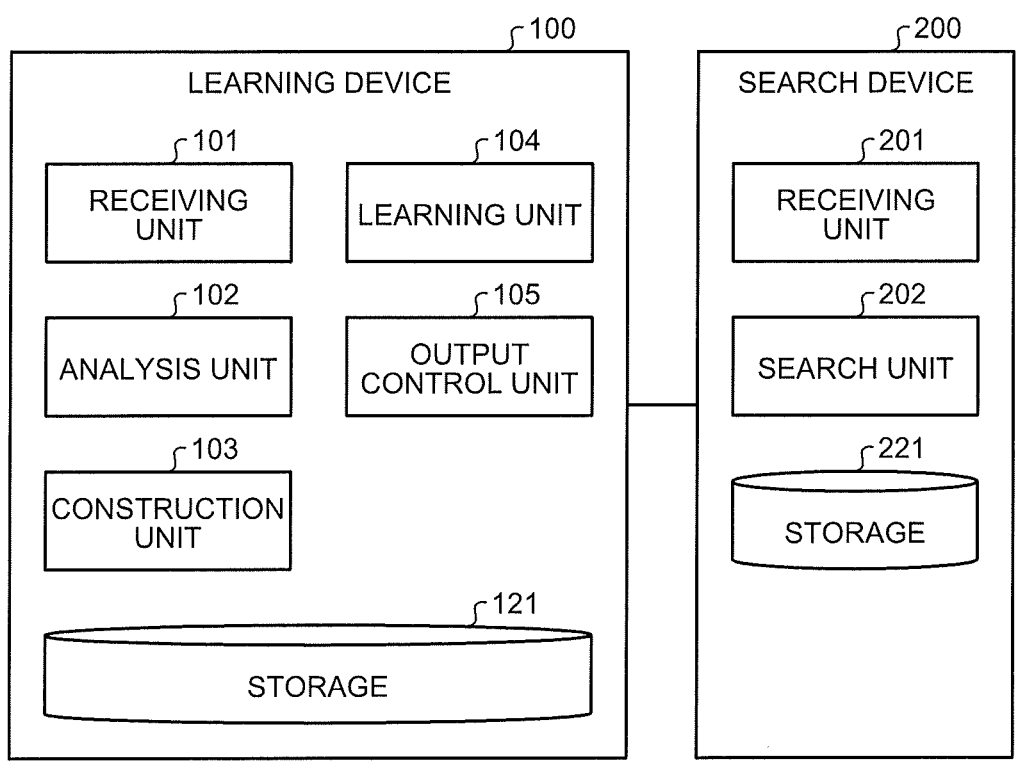
FIG. 1 is a block diagram of an information processing system including a learning device according to the present embodiment.

According to one embodiment, a learning device includes one or more processors. The processors input, to an input layer of a neural network including hidden layers defined for respective first arrangement patterns indicating arrangement of one or more words, and output layers connected with some of hidden layers, one or more first morphemes conforming to any of first arrangement patterns, among morphemes included in a document, and learn the neural network to minimize a difference between one or more second morphemes conforming to any of second arrangement patterns indicating arrangement of one or more words, among morphemes included in the document, and output morphemes from the neural network for the input first morphemes. The processors output an embedding vector of the first morphemes that is obtained based on a weight of the learned neural network.

A preferred embodiment of a learning device according to the present invention will be described in detail below with reference to the appended drawings.

For example, a method of using a word sequence representing contiguous words has the following problems. An expression in which words are noncontiguous like some idioms is not considered. Although a probability of occurrence, the number of surrounding words, and the like vary depending on the length of a word sequence, there is no distinction. Additionally, overlapping word sequences are independently treated. Thus, for example, embedding vectors for a combination of words such as "moshi xxx nara (meaning if xxx)" as a Japanese combination and "get xxx out" as an English combination cannot be appropriately obtained. In addition, a similarity between word sequences in an inclusive relationship tends to be high although the word sequences differ in meaning.

A learning device of the present embodiment learns an embedding vector for a set of one or more words including noncontiguous words. A set of one or more words is extracted from a given document as a set of words conforming to a plurality of predefined arrangement patterns. The arrangement patterns are not limited to an arrangement pattern of contiguous words, and may include an arrangement pattern of two or more words sandwiching any other morpheme therebetween. An embedding vector can thereby be obtained even for an expression such as an idiom in which words are noncontiguous.

In addition, the learning device of the present embodiment constructs a neural network to include a plurality of hidden layers defined for respective arrangement patterns, and an output layer connected with at least part of the plurality of hidden layers, and learns an embedding vector (weighting matrix) using the neural network. It thereby becomes possible to distinguish word sequences different in length, and to perform learning considering overlapping word sequences, for example.

In addition, an embedding vector is obtained for each word or each word sequence, but an embedding vector may be obtained on another basis. For example, an embedding vector may be obtained on a basis of a character string such as a morpheme. Hereinafter, the description will be given of a case where an embedding vector is obtained for each word or each word sequence.

FIG. 1 is a block diagram illustrating an example of a configuration of an information processing system including a learning device 100 according to the present embodiment. As illustrated in FIG. 1, the information processing system includes the learning device 100 and a search device 200. The learning device 100 and the search device 200 are connected via a network, a dedicated communication line, and the like, for example. The network may be a network of any form such as a wired network, a wireless network, and the Internet. At least one of the learning device 100 and the search device 200 may be implemented by a server device being a computer including a processor such as a central processing unit (CPU), for example, or the like. The server device may be a cloud server that executes processing on a cloud.

The learning device 100 is a device that obtains an embedding vector by learning a neural network. The search device 200 is a device that executes processing (search processing, etc.) using the obtained embedding vector. The learning device 100 and the search device 200 need not be separated devices, and for example, the learning device 100 may include functions of the search device 200.

The learning device 100 includes a receiving unit 101, an analysis unit 102, a construction unit 103, a learning unit 104, an output control unit 105, and storage 121.

The receiving unit 101 receives inputs of various types of information to be used in various types of processing to be performed by the learning device 100. For example, the receiving unit 101 receives an input of a document to be used in learning.

The analysis unit 102 analyzes the received document and outputs a word sequence included in the document. For example, the analysis unit 102 performs morphological analysis of the document and outputs an analysis result in which a plurality of words included in the document are separated and arranged.

Based on the analysis result, the construction unit 103 constructs a neural network for learning an embedding vector. The neural network includes a plurality of hidden layers defined for a plurality of respective arrangement patterns (first arrangement patterns) indicating arrangement of one or more words serving as a calculation target of an embedding vector, and an output layer connected with at least part of the plurality of hidden layers. Hereinafter, the arrangement patterns will be sometimes referred to as target arrangement patterns. The details of a construction method of a neural network will be described later.

The learning unit 104 learns a neural network. For example, the learning unit 104 inputs, to an input layer of the neural network constructed by the construction unit 103, a set of one or more words (first morphemes) conforming to any of the target arrangement patterns, among words included in the document. Hereinafter, a set of words conforming to the target arrangement pattern will be sometimes referred to as a target word. The target word is one word in some cases. In other cases, the target words are a plurality of words.

The learning unit 104 learns a neural network to minimize a difference between a result output from the neural network for the input target word, and a set of one or more words (second morphemes) (hereinafter, sometimes referred to as a surrounding word) conforming to any of a plurality of arrangement patterns (second arrangement patterns) indicating arrangement of surrounding words of the target word, among words included in the document.

Figure 2:
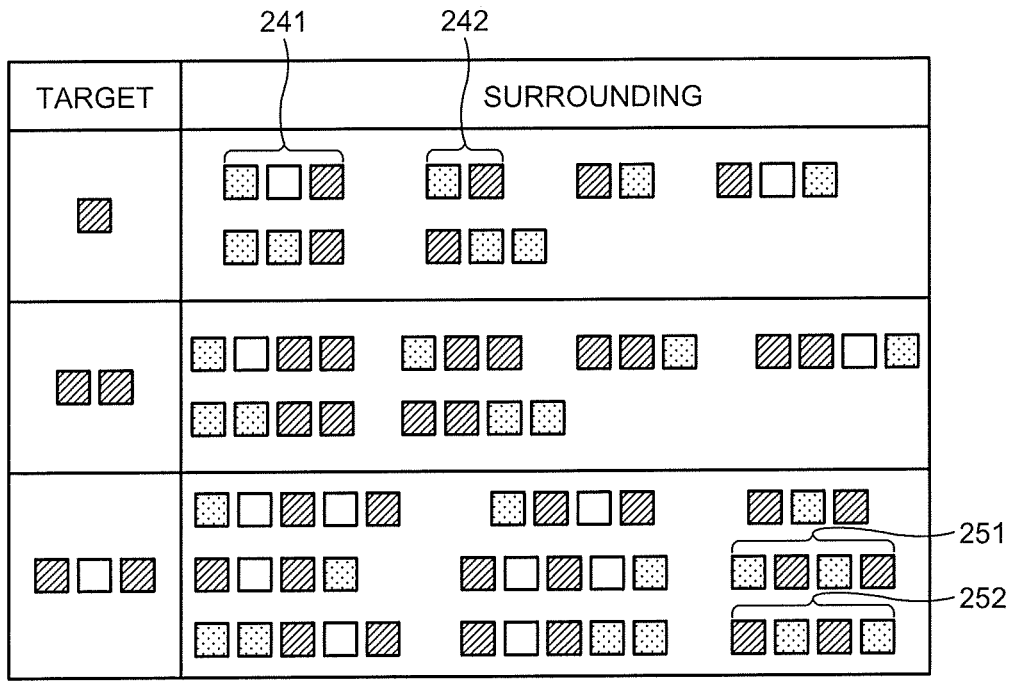
FIG. 2 is a diagram illustrating an example of a target arrangement pattern and a surrounding arrangement pattern.

The plurality of arrangement patterns indicating the arrangement of surrounding words is defined for each of the target arrangement patterns. Hereinafter, the plurality of arrangement patterns indicating the arrangement of surrounding words will be sometimes referred to as surrounding arrangement patterns. FIG. 2 is a diagram illustrating an example of a target arrangement pattern and a surrounding arrangement pattern.

A rectangle in FIG. 2 represents one word. A white rectangle represents a word that corresponds to neither a target word nor a surrounding word. In this manner, in the present embodiment, arrangement patterns of a plurality of words other than contiguous words can be used. An arrangement pattern 241 is a pattern indicating that a surrounding word exists on the left of a target word across one another word. In this manner, a target word and a surrounding word need not be contiguous with each other. An arrangement pattern 242 is a pattern indicating that a surrounding word exists on the left of a target word. As in arrangement patterns 251 and 252, a pattern in which target words and surrounding words are alternately arranged may be used.

The arrangement patterns illustrated in FIG. 2 are examples, and the arrangement patterns are not limited to these. For example, target arrangement patterns need not be categorized into three types and may be categorized into one type, two types, and four or more types. In addition, the number of target words included in a target arrangement pattern may be three or more.

In addition, an arrangement pattern in which a target word and a surrounding word include a duplicative word, which is not illustrated in FIG. 2, may be used. For example, in the arrangement pattern 242, only one word provided on the left of the target word is regarded as a surrounding word, but two words may be regarded as surrounding words. In addition, in the case of an arrangement pattern in which another word is sandwiched, the number of sandwiched words is not limited to one, and may be two or more. Furthermore, arrangement patterns may be distinguished by the number of sandwiched words, or arrangement patterns each including an arbitrary number of sandwiched words may be similarly treated.

The arrangement patterns of words (target arrangement pattern and surrounding arrangement pattern) can be generally formed in accordance with the number of words to be considered. When the number of words is five, first of all, arrangement patterns of $2^5-1=31$ types are defined in the following manner. A letter "w" indicates a target word or a surrounding word and a symbol "?" indicates another arbitrary word.

(?, ?, ?, ?, w)
(?, ?, ?, w, ?)
(?, ?, ?, w, w)
(?, ?, w ?, ?)
(?, ?, w, ?, w)
(?, ?, w, w, ?)
(?, ?, w, w, w)
(?, w, ?, ?, ?)
(?, w, ?, ?, w)
(?, w, ?, w, ?)
(?, w, ?, w, w)
(?, w, w, ?, ?)
(?, w, w, ?, w)
(?, w, w, w, ?)
(?, w, w, w, w)
(w, ?, ?, ?, ?)
(w, ?, ?, ?, w)
(w, ?, ?, w, ?)
(w, ?, ?, w, w)
(w, ?, w, ?, ?)
(w, ?, w, ?, w)
(w, ?, w, w, ?)
(w, ?, w, w, w)
(w, w, ?, ?, ?)
(w, w, ?, ?, w)
(w, w, ?, w, ?)
(w, w, ?, w, w)
(w, w, w, ?, ?)
(w, w, w, ?, w)
(w, w, w, w, ?)
(w, w, w, w, w)

Because patterns in which symbols "?" are provided on both ends can be regarded as the same patterns, the arrangement patterns are actually categorized into the following 16 types.

(w)
(w, w)
(w, ?, w)
(w, ?, ?, w)
(w, ?, ?, ?, w)
(w, w, w)
(w, ?, w, w)
(w, w, ?, w)
(w, ?, ?, w, w)
(w, ?, w, ?, w)
(w, w, ?, ?, w)
(w, w, w, w)
(w, ?, w, w, w)
(w, w, ?, w, w)
(w, w, w, ?, w)
(w, w, w, w, w)

If arrangement patterns are not distinguished by the number of sandwiched words, for example, patterns (w, ?, w), (w, ?, ?, w), and, (w, ?, ?, ?, w) can be regarded as one pattern (w, *, w). A symbol "*" indicates an arbitrary number of arbitrary words.

Information indicating correspondence between a target arrangement pattern and a surrounding arrangement pattern as illustrated in FIG. 2 is prestored into the storage 121.

Referring back to FIG. 1, the output control unit 105 controls output of various types of information that is performed by the learning device 100. For example, the output control unit 105 outputs an embedding vector obtained based on a weight of the learned neural network. Any method may be used as an output method. For example, the output control unit 105 outputs an embedding vector (or a weighting matrix of a neural network including an embedding vector) to the search device 200.

The storage 121 stores various types of information to be used in various types of processing to be performed by the learning device 100. For example, the storage 121 stores an input document, a word sequence analyzed from the document, parameters of the constructed neural network, arrangement patterns, and the like.

Each unit of the learning device 100 (the receiving unit 101, the analysis unit 102, the construction unit 103, the learning unit 104, and the output control unit 105) is implemented by one or a plurality of processors, for example. For example, each of the above-described units may be implemented by causing a processor such as a central processing unit (CPU) to execute a program, that is to say, may be implemented by software. Each of the above-described units may be implemented by a processor such as a dedicated integrated circuit (IC), that is to say, may be implemented by hardware. Each of the above-described units may be implemented by using both software and hardware. In the case of using a plurality of processors, each processor may implement one of the units, or may implement two or more of the units.

Next, a configuration of the search device 200 will be described. The search device 200 includes a receiving unit 201, a search unit 202, and storage 221.

The receiving unit 201 receives inputs of various types of information to be used in various types of processing to be performed by the search device 200. For example, the receiving unit 201 receives an embedding vector output from the learning device 100.

The search unit 202 searches for a character string (word, morpheme, etc.) using an embedding vector. For example, the search unit 202 searches for a word similar to a certain word, based on a similarity between embedding vectors. In addition, processing that uses an embedding vector is not limited to the search processing, and may be any processing.

The storage 221 stores various types of information to be used in various types of processing to be performed by the search device 200. For example, the storage 221 stores an embedding vector output from the learning device 100.

Each unit of the search device 200 (the receiving unit 201 and the search unit 202) is implemented by one or a plurality of processors, for example. For example, each of the above-described units may be implemented by causing a processor such as a CPU to execute a program, that is to say, may be implemented by software. Each of the above-described units may be implemented by a processor such as a dedicated IC, that is to say, may be implemented by hardware. Each of the above-described units may be implemented by using both software and hardware. In the case of using a plurality of processors, each processor may implement one of the units, or may implement two or more of the units.

In addition, the storage 121 or 221 may be formed by any generally-used storage medium such as a flash memory, a memory card, a random access memory (RAM), a hard disk drive (HDD), and an optical disc.

Figure 3:
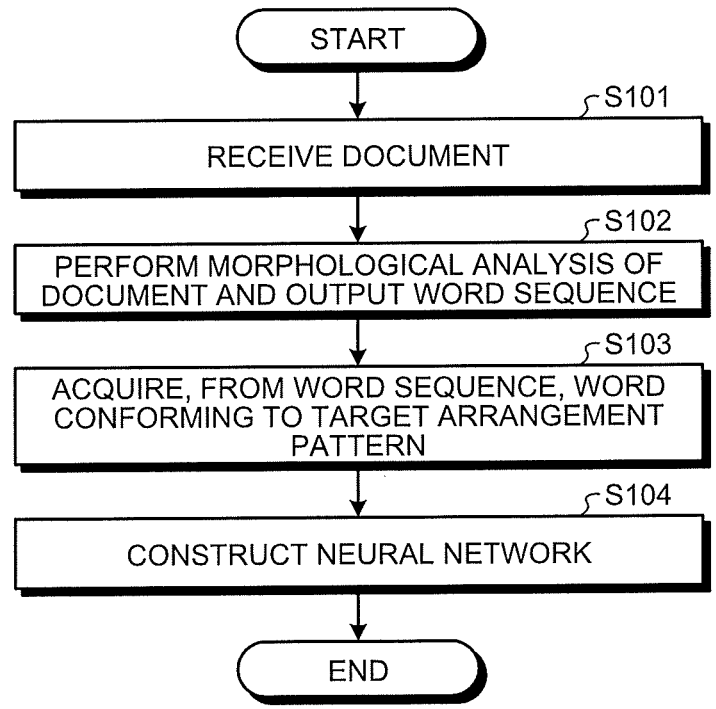
FIG. 3 is a flowchart of construction processing in the present embodiment.

Next, construction processing of a neural network that is to be performed by the learning device 100 according to the present embodiment having the above-described configuration will be described. FIG. 3 is a flowchart illustrating an example of construction processing in the present embodiment. In addition, arrangement patterns of words (target arrangement pattern and surrounding arrangement pattern) are given in advance and stored in the storage 121, for example.

The receiving unit 101 receives an input of a document including a word serving as a target for calculating an embedding vector (Step S101). The analysis unit 102 performs morphological analysis of the received document and outputs a morphological analysis result (word sequence) including arranged words (Step S102).

FIG. 4 is a diagram illustrating an example of word information referred to in morphological analysis. For example, based on word information as illustrated in FIG. 4, the analysis unit 102 prepares candidates of word sequences for the given document. Then, from among the candidates of word sequences, a candidate having the highest evaluation value due to an evaluation value of a word, an evaluation value of a word class, evaluation values of words, evaluation values of word classes, and the like is selected as a morphological analysis result. In addition, for the sake of explanatory convenience, letters in parentheses in FIG. 4 indicate pronunciation in Japanese, but word information needs not include information indicating pronunciation.

FIG. 5 is a diagram illustrating an example of a morphological analysis result. FIG. 5 illustrates an example indicating that a word sequence 502 separated by symbols "/" is output as a morphological analysis result of a Japanese sentence 501 meaning that "it is nice weather today". The word sequence 502 is a word sequence in which seven words 511 to 517 are arranged. In addition, for the sake of explanatory convenience, letters in parentheses in FIG. 5 indicate pronunciation in Japanese, but the morphological analysis result needs not include information indicating pronunciation.

Referring back to FIG. 3, the construction unit 103 acquires, from the obtained word sequence, a word (target word) conforming to a target arrangement pattern (Step S103). For example, the construction unit 103 checks each word included in the word sequence, against each target arrangement pattern stored in the storage 121, from the beginning to the end of the word sequence. A target word obtained by the check is stored for each target arrangement pattern.

In the example in FIG. 5, because the seven words are obtained, there are seven types of words conforming to target arrangement patterns indicating the arrangement of one word ("kyo", "wa", "ii", "tenki", "desu", "ne", "."). In addition, there are six types of word sequences conforming to target arrangement patterns indicating the arrangement of two words ("kyo wa", "wa ii", "ii tenki", "tenki desu", "desu ne", "ne ."). In addition, there are five types of word sequences conforming to target arrangement patterns indicating the arrangement of two words sandwiching another one word therebetween ("kyo ii", "wa tenki", "ii desu", "tenki ne", "desu ."). The construction unit 103 stores target words of 18 types in total into the storage 121.

When the check ends, the construction unit 103 constructs a neural network including three layers of an input layer, a hidden layer, and an output layer (Step S104). Here, a construction method of a neural network for obtaining an embedding vector will be described using FIGS. 6 and 7.

Figure 6:
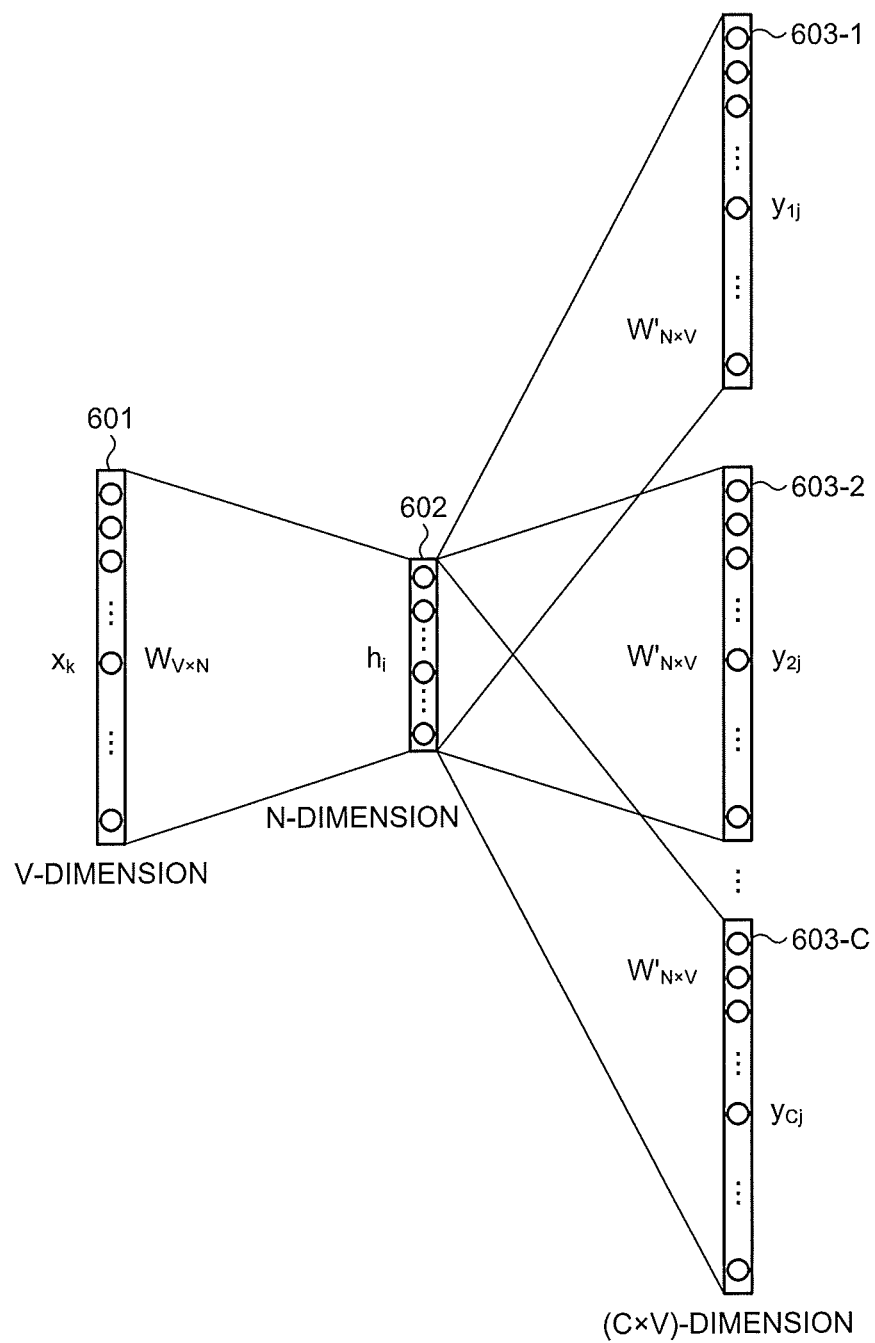
FIG. 6 is a diagram illustrating a configuration example of a neural network.

FIG. 6 is a diagram illustrating a configuration example of a neural network that is constructed not using a method of the present embodiment. A neural network illustrated in FIG. 6 includes an input layer 601, a hidden layer 602, and output layers 603-1 to 603-C.

The number of nodes of the input layer 601 and the output layers 603-1 to 603-C is V. In other words, the input layer 601 and the output layers 603-1 to 603-C each include nodes respectively corresponding to V words $x_k$ ($1 \leq k \leq V$). The number of nodes of the hidden layer 602 is N ($h_i$, $1 \leq i \leq N$). The input layer 601 and the hidden layer 602 are associated with each other by a weighting matrix $W_{V \times N}$ including N rows and V columns. Each row of the learned weighting matrix $W_{V \times N}$ corresponds to an embedding vector. The number N of nodes of the hidden layer 602 corresponds to a dimension number of embedding vectors. In addition, an expression form of an embedding vector may be any form. For example, a space of embedding vectors may be an N-dimensional hyperspherical surface or an N-dimensional hyperbolic space.

The number C of output layers corresponds to the number of surrounding words (surrounding arrangement patterns). For example, if six words in total including the third left word, the second left word, the first left word, the first right word, the second right word, and the third right word of a certain word are regarded as surrounding words, the number C becomes six. Each of the output layers 603-1 to 603-C is associated with the hidden layer 602 by a weighting matrix $W'_{N \times V}$ ($y_{1j}, y_{2j}, \ldots, y_{cj}$, $1 \leq j \leq V$).

FIG. 6 illustrates an example in which one word is used as a target word, but two or more words (word sequences) can be used as target words.

Figure 7:
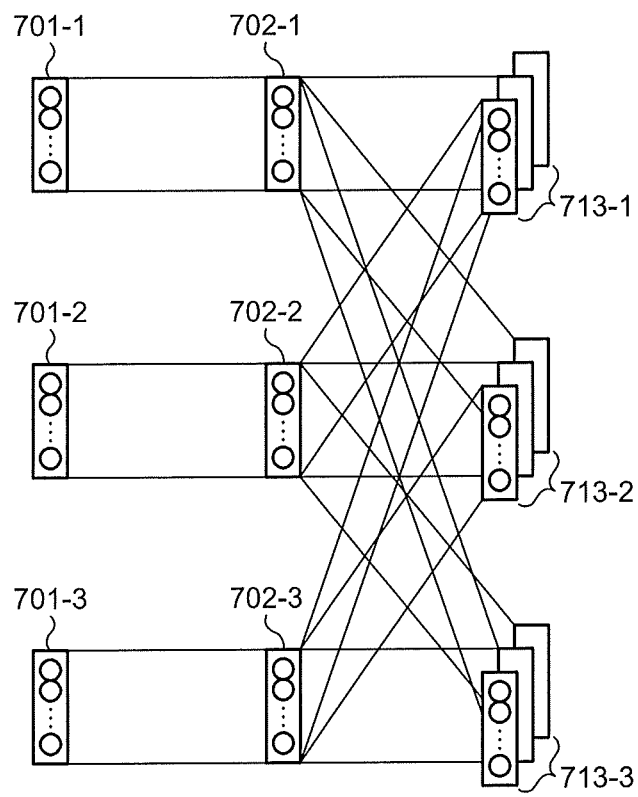
FIG. 7 is a diagram illustrating a configuration example of a neural network.

FIG. 7 is a diagram illustrating a configuration example of a neural network to be constructed in the present embodiment. A neural network of the present embodiment includes input layers 701-1 to 701-3, hidden layers 702-1 to 702-3, and output layers 713-1 to 713-3.

As illustrated in FIG. 7, the neural network of the present embodiment includes a plurality of input layers 701-1 to 701-3 and a plurality of hidden layers 702-1 to 702-3.

The input layers and the hidden layers are included in accordance with target arrangement patterns. For example, in the case of using three target arrangement patterns corresponding to one word, two contiguous words, and three contiguous words, the input layers 701-1 to 701-3 respectively correspond to layers inputting one word, two contiguous words, and three contiguous words. In addition, for example, in the case of using the three target arrangement patterns illustrated in FIG. 2, the input layers 701-1 to 701-3 respectively correspond to layers inputting one word, two contiguous words, and two words sandwiching another one word therebetween.

In addition, the number of input layers and the number of hidden layers are not limited to three, and are changed in accordance with the number of target arrangement patterns. In the present embodiment, a weighting matrix is set for each target arrangement pattern, and each weighting matrix is learned.

The hidden layers 702-1 to 702-3 are respectively connected to the input layers 701-1 to 701-3. The number of nodes of each of the hidden layers 702-1 to 702-3 corresponds to a dimension number N of an embedding vector. In addition, the number of nodes (dimension number) of at least part of the hidden layers may be made different from the number of nodes of the other hidden layers.

The output layers 713-1 to 713-3 respectively correspond to the output layers 603-1 to 603-C in FIG. 6, for example. In other words, output layers corresponding to each target arrangement pattern are included in the number corresponding to the number of surrounding arrangement patterns corresponding to the target arrangement pattern.

For constructing a neural network as illustrated in FIG. 7, first of all, the construction unit 103 prepares, as input layers and output layers, nodes in the number corresponding to the number of types of target words stored for the respective target arrangement patterns. As a surrounding arrangement pattern, even if the same one word is arranged, an arrangement pattern can vary depending on the position of the word such as the second left word, the first left word, the first right word, and the second right word. Thus, the construction unit 103 prepares output layers in the number corresponding to the number of surrounding arrangement patterns corresponding to each target arrangement pattern. The construction unit 103 combines the input layers and the hidden layers separately for the respective word arrangement patterns.

The construction unit 103 further combines the hidden layers and the output layers. At this time, the construction unit 103 mutually combines a hidden layer and an output layer that respectively correspond to different target arrangement patterns. The construction unit 103 may combine all the hidden layers and the output layers, or may combine a hidden layer and an output layer that are included in a predefined combination among combinations of hidden layers and output layers. For example, a predefined combination is a combination defined based on correspondence between a target arrangement pattern and a surrounding arrangement pattern as illustrated in FIG. 2.

For example, if target words are two contiguous words, in the example in FIG. 2, surrounding arrangement patterns include a pattern including one word as a surrounding word, and a pattern including two words as surrounding words. Accordingly, the output layer 713-1 corresponding to one surrounding word and the output layer 713-2 corresponding to two words are combined to the hidden layer 702-2 corresponding to two contiguous target words.

The construction unit 103 may construct a neural network in such a manner that a word sequence obtained by combining a target word and a surrounding word can be regarded as a surrounding word and considered in learning. In addition, if surrounding words include a plurality of words, the construction unit 103 may construct a neural network in such a manner that words included in the surrounding words can be regarded as surrounding words and considered in learning.

Figure 8:
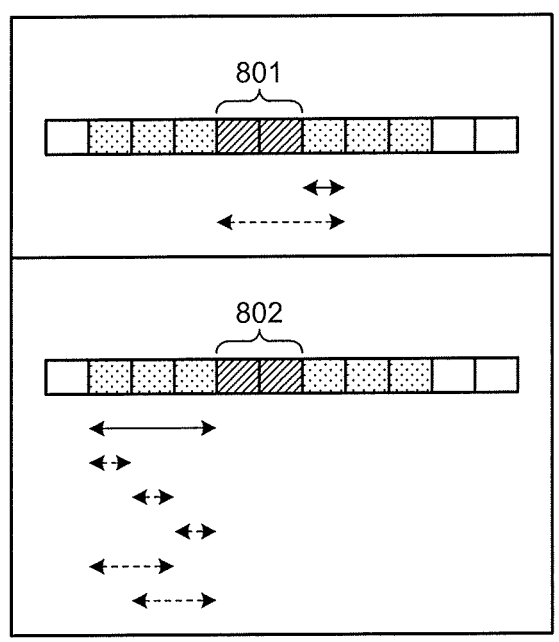
FIG. 8 is a diagram illustrating an example of a target word and a surrounding word.

FIG. 8 is a diagram illustrating an example of a target word and a surrounding word in such a case. In the example illustrated in FIG. 8, target words 801 and 802 each include two words. If a surrounding word is one word provided on the right of the target words 801, three words obtained by combining the target words 801 and the surrounding word may also be considered as surrounding words. Thus, the construction unit 103 constructs a neural network in which not only an output layer corresponding to one surrounding word but also an output layer corresponding to three words are combined to a hidden layer corresponding to two target words.

In addition, if left three contiguous words of the target word 802 are regarded as surrounding words, the three words included in the surrounding words and two contiguous words are further considered as surrounding words as well. Thus, the construction unit 103 constructs a neural network in which not only an output layer corresponding to three surrounding words but also an output layer corresponding to one word and an output layer corresponding to two words are combined to a hidden layer corresponding to two target words.

After constructing a neural network in this manner, the construction unit 103 initializes each parameter (weighting matrix, etc.) of the neural network at random, for example.

Figure 9:
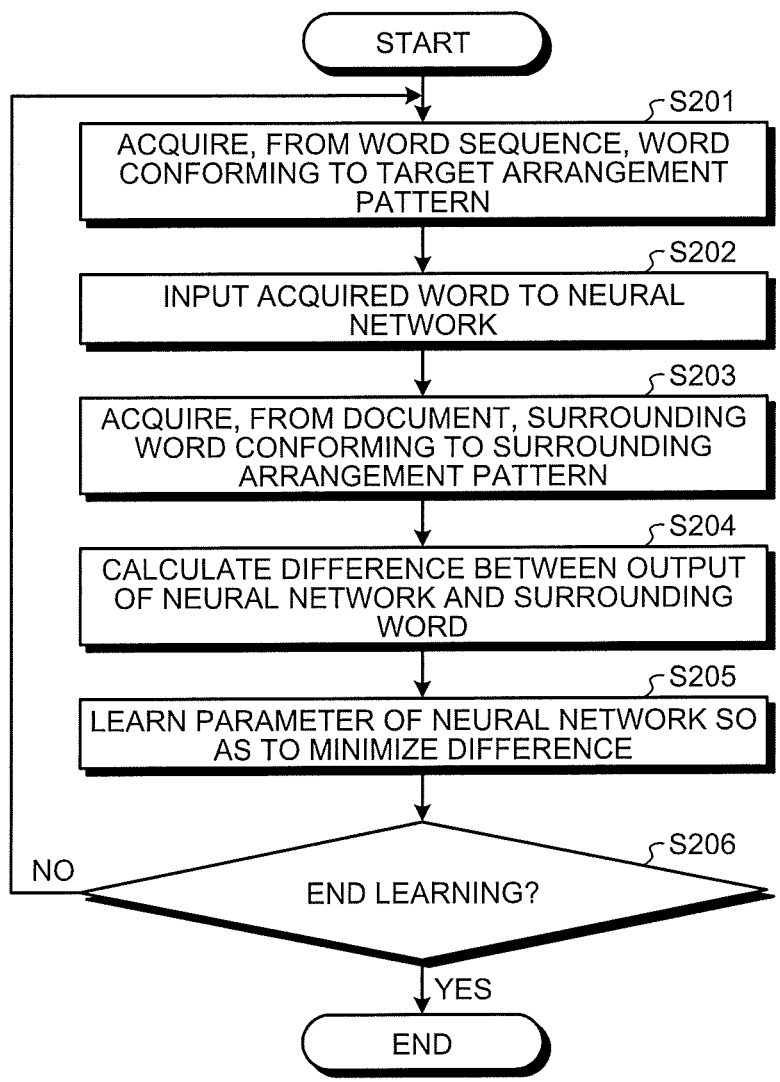
FIG. 9 is a flowchart of learning processing in the present embodiment.

Next, learning processing of a neural network that is to be performed by the learning device 100 according to the present embodiment will be described. FIG. 9 is a flowchart illustrating an example of learning processing in the present embodiment.

The learning unit 104 acquires, from the word sequence obtained in Step S102 in FIG. 3, for example, a target word conforming to a target arrangement pattern (Step S201). The processing is similar to Step S103 in FIG. 3. The learning unit 104 turns on one node of an input layer corresponding to a target word obtained by the check, and performs inferencing of the neural network (Step S202). The inferencing corresponds to predicting a surrounding word (one word or a set of words) from the target word (one word or a set of words). At this time, softmax is performed within a range corresponding not to the entire network but to the surrounding words. The inferred output is denoted by y.

On the other hand, the learning unit 104 obtains a surrounding arrangement pattern stored in association with the target arrangement pattern used in the check in Step S201. Then, the learning unit 104 acquires, from the word sequence obtained in Step S102 in FIG. 3, for example, one or more surrounding words t conforming to the obtained surrounding arrangement pattern (Step S203). The learning unit 104 calculates a difference between the inferred output y and the surrounding words t acquired in the check against the surrounding arrangement pattern (Step S204). As a method of calculating a difference (similarity) between words, a method of obtaining y-t within a range corresponding to surrounding words subjected to softmax, or the like can be applied.

The learning unit 104 learns a parameter (e.g. weighting matrix) of the neural network to minimize the calculated difference (Step S205). For example, based on η(y-t) obtained by multiplying the calculated difference by a parameter $r_l$ for defining a learning rate, the learning unit 104 adjusts a weighting matrix for defining a neural network, using backpropagation. The learning rate can be interpreted to represent a weight to be added to a difference. For example, the learning unit 104 propagates the difference from an output layer of a neural network in a backward direction, and updates a parameter of each layer to reduce the difference. The learning unit 104 may update the parameter using a method other than the backpropagation.

In the example as illustrated in FIG. 5, first of all, the word 511 ("kyo") is obtained by the check as a target word. Among stored surrounding arrangement patterns, as for a pattern in which a left word is regarded as a surrounding word (e.g. arrangement pattern 242 in FIG. 2), because no word exists on the left of the word 511, a surrounding word is not obtained. On the other hand, as for a surrounding arrangement pattern in which a right word is regarded as a surrounding word, such as a pattern in which the first right word is regarded as a surrounding word, for example, the word 512 ("wa") is obtained as a surrounding word. As another example, as for a pattern in which the second right word is regarded as a surrounding word, the word 513 ("ii") is obtained as a surrounding word. As yet another example, as for a pattern in which the first right word and the second right word are regarded as surrounding words, a word sequence (wa ii) including the word 512 and the word 513 is obtained as surrounding words. The learning unit 104 performs learning in such a manner that an output of the neural network approaches these surrounding words.

A common value of a learning rate may be used for all the surrounding arrangement patterns, or different values may be used for at least part of the surrounding arrangement patterns. In other words, the learning unit 104 may change a weight to be added to a difference, depending on a positional relationship between a target word and a surrounding word. For example, a value of a learning rate may be reduced for a surrounding arrangement pattern in which a distance between a target word and a surrounding word is far, and a value of a learning rate may be increased for a surrounding arrangement pattern in which the distance is close.

Furthermore, if a target word and a surrounding word overlap at least partially, the learning unit 104 may make a value of a learning rate smaller than a value set if the target word and the surrounding word do not overlap. For example, if a target word and a surrounding word overlap or if the target word and the surrounding word are alternately arranged, the learning unit 104 may set a negative value as a learning rate.

For example, as for an arrangement pattern of two or more words sandwiching another word ("moshi xxx nara (meaning if xxx)", etc.), in some cases, a sandwiched word may be any word. Nevertheless, if a learning rate is uniformly given, learning is executed in a direction for bringing closer an embedding vector of an expression conforming to such an arrangement pattern ("moshi xxx nara (meaning if xxx)", etc.), and an embedding vector of a word appearing between the expression in the target document. In other words, a word used in a target document is learned as a more similar word than other words. As described above, if a target word and a surrounding word overlap or if the target word and the surrounding word are alternately arranged, such an operation can be excluded by setting a negative value as a learning rate.

The learning unit 104 executes the processing in Steps S201 to S205 for all the target arrangement patterns.

After the processing has been executed for all the target arrangement patterns, the learning unit 104 determines whether to end the learning (Step S206). For example, if a difference between the inferred output y and the surrounding words t acquired in the check against the surrounding arrangement pattern becomes smaller than a predefined threshold, the learning unit 104 determines to end the learning. A determination method of a learning end is not limited to this, and any method may be used. For example, the learning unit 104 may determine to end the learning, if the number of learnings exceeds a prescribed value.

If it is determined that the learning is not to be ended (Step S206: No), the processing returns to Step S201, and the check and the like that use each target arrangement pattern are repeated again. If it is determined that the learning is to be ended (Step S206: Yes), the learning processing in FIG. 9 ends.

Figure 10:
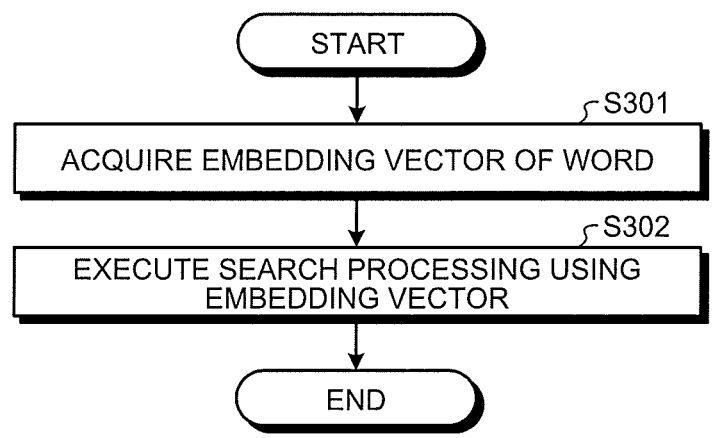
FIG. 10 is a flowchart of search processing in the present embodiment.

Next, search processing to be performed by the search device 200 according to the present embodiment will be described. FIG. 10 is a flowchart illustrating an example of search processing in the present embodiment.

The receiving unit 201 of the search device 200 acquires, from the learning device 100, for example, an embedding vector obtained from a weighting matrix of a learned neural network (Step S301). The search unit 202 executes search processing using the acquired embedding vector (Step S302). For example, based on a similarity between embedding vectors, the search unit 202 searches a word (word sequence) included in the same document as a certain word (word sequence), or a word (word sequence) included in another document, a word (word sequence) similar to the certain word (word sequence). The similarity between embedding vectors can be obtained from an inner product between vectors, for example. A distance between vectors may be used as the similarity.

The processing that uses an embedding vector is not limited to the search processing, and may be any processing. The functions of the search device 200 may be included in the learning device 100.

As described above, in the present embodiment, an embedding vector can be calculated even for an expression (idiom, etc.) in which words are noncontiguous. In addition, because layers of a neural network are separately formed for each arrangement pattern of words (e.g. for each number of words), processing can be differentiated for each arrangement pattern (arrangement patterns can be fairly treated), and an embedding vector can be obtained more accurately.

Figure 11:
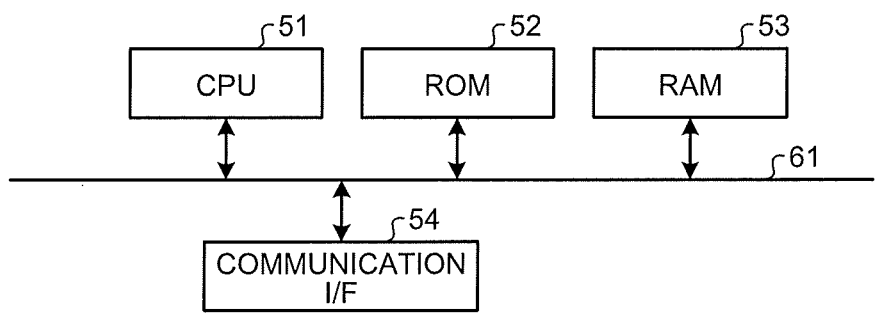
FIG. 11 is a hardware configuration diagram of the learning device according to the present embodiment.

Next, a hardware configuration of the learning device according to the present embodiment will be described using FIG. 11. FIG. 11 is an explanatory diagram illustrating a hardware configuration example of the learning device according to the present embodiment.

The learning device according to the present embodiment includes a control device such as a central processing unit (CPU) 51, a storage device such as a read only memory (ROM) 52 and a random access memory (RAM) 53, a communication I/F 54 that connects to a network and performs communication, and a bus 61 that connects the units.

Programs to be executed by the learning device according to the present embodiment are provided with being preinstalled on the ROM 52 or the like.

Programs to be executed by the learning device according to the present embodiment may be provided as a computer program product with being recorded on a computer-readable recording medium such as a compact disk read only memory (CD-ROM), a flexible disk (FD), a compact disk recordable (CD-R), and a digital versatile disk (DVD), in files having an installable format or an executable format.

Furthermore, programs to be executed by the learning device according to the present embodiment may be stored on a computer connected to a network such as the Internet, and provided by being downloaded via the network. In addition, programs to be executed by the learning device according to the present embodiment may be provided or delivered via a network such as the Internet.

Programs to be executed by the learning device according to the present embodiment can cause a computer to function as each of the above-described units of the learning device. The computer can execute a program by the CPU 51 loading the program from a computer-readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device comprising:
one or more processors configured to
input, to an input layer of a neural network including M hidden layers and M output layers, one or more first morphemes conforming to any of M first arrangement patterns indicating an arrangement of one or more words, among morphemes included in a document, M being an integer, each of the M hidden layers being defined for one of the M first arrangement patterns, each of the M output layers being defined for one of the M first arrangement patterns, m-th ($1 \leq m \leq M$) hidden layer among M hidden layers being connected to m-th output layer among M output layers and being connected to at least one of the M output layers other than the m-th output layer, each of the hidden layers being connected to the input layer without being connected to other hidden layers, and
learn the neural network to minimize a difference between one or more second morphemes conforming to any of second arrangement patterns indicating an arrangement of one or more words, among morphemes included in the document, and output morphemes from the neural network for the input first morphemes; and
output an embedding vector of the first morphemes that is obtained based on a weight of the learned neural network.

2. The learning device according to claim 1, wherein the one or more processors change the weight of the network depending on a positional relationship between the first morphemes and the second morphemes.

3. The learning device according to claim 2, wherein in a case where the first morphemes and the second morphemes overlap at least partially, the one or more processors make the weight smaller in a case where the first morphemes and the second morphemes do not overlap.

4. The learning device according to claim 1, wherein the first arrangement patterns and the second arrangement patterns are patterns each indicating arrangement of two or more morphemes.

5. The learning device according to claim 4, wherein the first arrangement patterns and the second arrangement patterns are patterns each indicating arrangement of two or more morphemes that are noncontiguous.

6. The learning device according to claim 1, wherein
the first arrangement patterns indicates arrangement of one or more first words, and
the second arrangement patterns indicates arrangement of one or more second words that surround the first words.

7. A learning method comprising:
inputting, to an input layer of a neural network including M hidden layers and M output layers, one or more first morphemes conforming to any of M first arrangement patterns indicating an arrangement of one or more words, among morphemes included in a document, M being an integer, each of the M hidden layers being defined for one of the M first arrangement patterns, each of the M output layers being defined for one of the M first arrangement patterns, m-th ($1 \leq m \leq M$) hidden layer among M hidden layers being connected to m-th output layer among M output layers and being connected to at least one of the M output layers other than the m-th output layer, each of the hidden layers being connected to the input layer without being connected to other hidden layers;
learning the neural network to minimize a difference between one or more second morphemes conforming to any of second arrangement patterns indicating an arrangement of one or more words, among morphemes included in the document, and output morphemes from the neural network for the input first morphemes; and
outputting an embedding vector of the first morphemes that is obtained based on a weight of the learned neural network.

8. A computer program product having a non-transitory computer readable medium including programmed instructions, wherein the instructions, when executed by a computer, cause the computer to perform:
inputting, to an input layer of a neural network including M hidden layers and M output layers, one or more first morphemes conforming to any of M first arrangement patterns indicating an arrangement of one or more words, among morphemes included in a document, M being an integer, each of the M hidden layers being defined for one of the M first arrangement patterns, each of the M output layers being defined for one of the M first arrangement patterns, m-th ($1 \leq m \leq M$) hidden layer among M hidden layers being connected to m-th output layer among M output layers and being connected to at least one of the M output layers other than the m-th output layer, each of the hidden layers being connected to the input layer without being connected to other hidden layers;
learning the neural network to minimize a difference between one or more second morphemes conforming to any of a plurality of second arrangement patterns indicating an arrangement of one or more words, among morphemes included in the document, and output morphemes from the neural network for the input first morphemes; and
outputting an embedding vector of the first morphemes that is obtained based on a weight of the learned neural network.

9. An information processing system comprising:
one or more processors configured to
input, to an input layer of a neural network including M hidden layers and M output layers, one or more first morphemes conforming to any of M first arrangement patterns indicating an arrangement of one or more words, among morphemes included in a document, M being an integer, each of the M hidden layers being defined for one of the M first arrangement patterns, each of the M output layers being defined for one of the M first arrangement patterns, m-th ($1 \leq m \leq M$) hidden layer among M hidden layers being connected to m-th output layer among M output layers and being connected to at least one of the M output layers other than the m-th output layer, each of the hidden layers being connected to the input layer without being connected to other hidden layers, and
learn the neural network to minimize a difference between one or more second morphemes conforming to any of second arrangement patterns indicating an arrangement of one or more words, among morphemes included in the document, and output morphemes from the neural network for the input first morphemes; and
output an embedding vector of the first morphemes that is obtained based on a weight of the learned neural network.

10. The information processing system according to claim 9, wherein
the one or more processors search for a morpheme using the embedding vector.

* * * * *